No. 718,846. PATENTED JAN. 20, 1903.
W. W. KEIRSTEAD.
BATTERY CONNECTION.
APPLICATION FILED MAY 10, 1902.
NO MODEL.
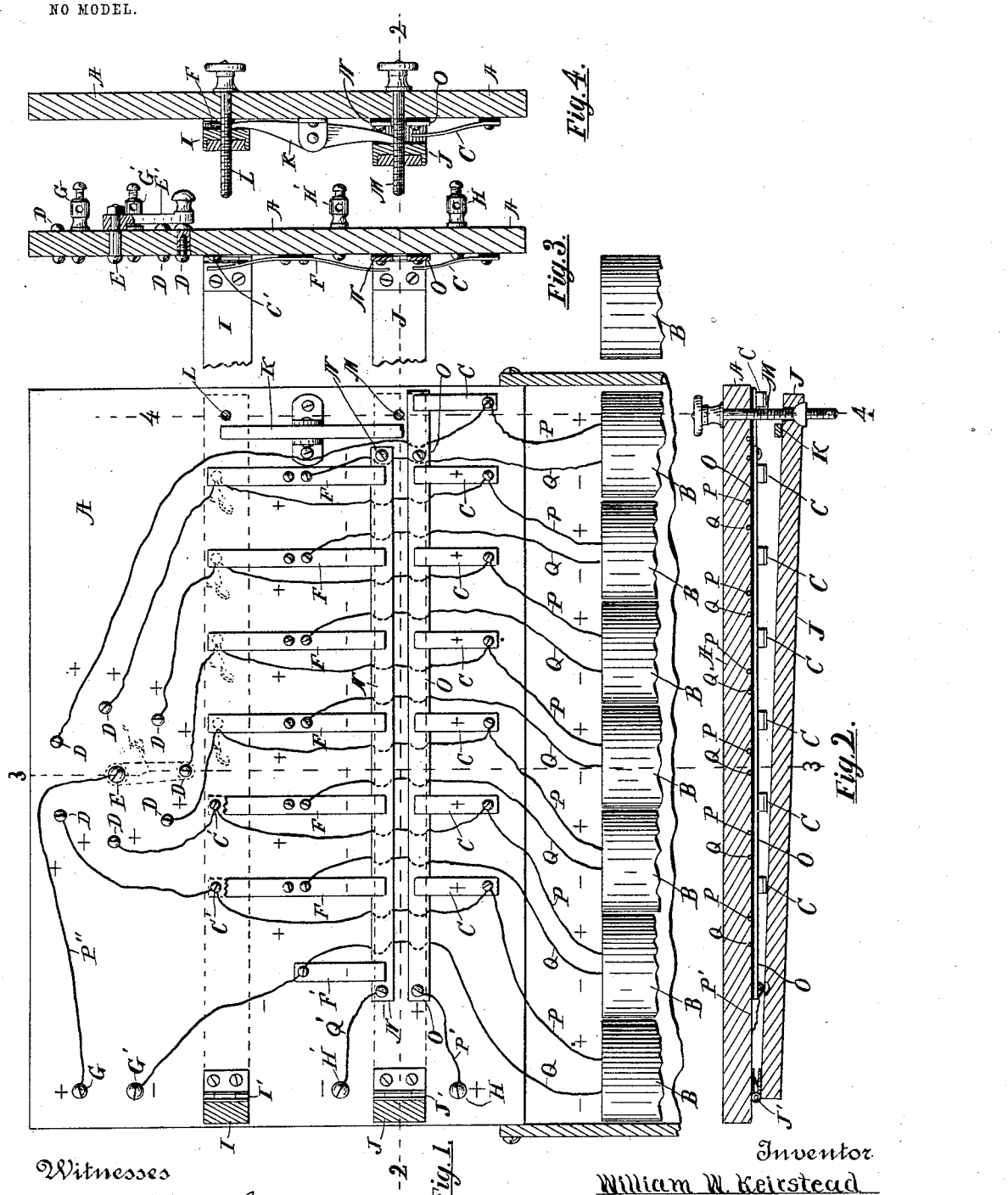

UNITED STATES PATENT OFFICE.

WILLIAM W. KEIRSTEAD, OF GRAND RAPIDS, MICHIGAN.

BATTERY CONNECTION.

SPECIFICATION forming part of Letters Patent No. 718,846, dated January 20, 1903.

Application filed May 10, 1902. Serial No. 106,725. (No model.)

*To all whom it may concern:*

Be it known that I, WILLIAM W. KEIRSTEAD, a citizen of the United States, residing at Grand Rapids, in the county of Kent and State of Michigan, have invented certain new and useful Improvements in Multiple and Series Battery Connections; and I do hereby declare the following to be a full, clear, and exact description of the invention, such as will enable others skilled in the art to which it appertains to make and use the same.

My invention relates to improvements in multiple and series battery connections; and its object is to provide means whereby a number of battery-cells may be readily and conveniently connected either in multiple or in series and successively cut into or out of the circuit at pleasure when connected in either relation, whereby the battery may be conveniently used for various purposes, and especially for medical and surgical uses, to administer electric treatment or for operating a small electric light or an electric cautery, and to provide the device with certain new and useful features, as hereinafter more fully described, and particularly pointed out in the claims.

My invention consists, essentially, in the combination and arrangement of a series of battery-cells, a pair of bus-bars, a rotary switch, means for connecting and disconnecting the respective poles of each cell to the respective bus-bar, and means for connecting and disconnecting the cells in series with the rotary switch, as will more fully appear by reference to the accompanying drawings, in which—

Figure 1 is an elevation of a device embodying my invention; Fig. 2, a horizontal section of the same on the line 2 2; Fig. 3, a vertical section on the line 3 3; and Fig. 4, a detail of the safety-lever, showing a section on the line 4 4.

Like letters refer to like parts in all figures.

A represents any suitable support of non-conducting material, preferably the cover of a suitable box, to contain the apparatus. A series of battery-cells B of any convenient construction and any convenient number may be used in connection with my device, and a corresponding number of circuit-closers C, preferably consisting of spring-electrodes attached to the support A at one end and arranged in a row with their movable ends above a bus-bar O and normally out of contact therewith. Near the bus-bar O and parallel therewith is another bus-bar N, and above this is another series of circuit-closers corresponding in number with the battery-cells, each of which is double-acting, having both ends free and being attached at the middle to the support A. One end of each circuit-closer F is above and normally out of contact with the bus-bar N, and beneath the other end of each circuit-closer is a contact-point C'. The first one, F', of this series of circuit-closers engages the bus-bar N only.

E is the center post of the rotary switch, and equidistant from the same are a series of contacts D, one for each battery-cell. These contacts D are respectively connected with the post E by the usual shifting arm E'.

G and G' are a pair of binding-posts used when the cells are connected in multiple. If preferred, both the series and the multiple circuits can be connected to a single pair of posts. To bring the circuit-closers F in contact with the points C', and thus connect the cells in series, a bar I is hinged at one end of the support A, as at I', and the other end of said bar is pressed against the closers by a screw L. A similar bar J, correspondingly hinged at J' and pressed against the closers C and F by a screw M, serves to bring said closers in contact with the respective bus-bars N and O, all the closers C contacting with the bar O and all the closers F simultaneously contacting with the bar N. These presser-bars being pivoted at one end and movable at the other end will bring each pair of closers successively in contact with the bus-bars, beginning at the end of the series nearest the pivoted end of the presser-bar. To prevent short-circuiting by bringing down both bars I and J at once, a lever K is pivoted on the support A midway between the bars I and J and with its respective ends beneath the respective presser-bars. Thus when one bar is depressed the opposite end of the lever K is elevated and prevents depression of the other presser-bar.

The wiring is as follows: The posts H and H' are connected to the respective bus-bars by wires P' and Q'. One pole of the first cell of the series is connected to the post G' and the closer F' by one of the wires Q. The corresponding pole of each remaining cell is connected to a corresponding closer F by a wire Q. The other pole of each cell is connected to a corresponding one of the closers C and one of the contacts C' and one of the rotary switch-contacts D by a wire P. From the foregoing the operation of my device will be readily understood. By slacking off both of the presser-bars I and J all the battery-cells are disconnected except the first, which by connecting the arm E' of the rotary switch with the first contact D would operate the first cell alone. If now the bar I be drawn down by the screw, the closers F will be successively brought down upon the contacts C' and the cells will be connected in series for high voltage, and by shifting the arm E' of the rotary switch one after another of the cells will be brought into the circuit, as occasion may require. By slacking off the bar I and turning down the bar J the respective pairs of circuit-closers F and C are successively brought in contact with the respective bus-bars N and O and each cell in succession connected directly to the bus-bars, thus connecting the cells in multiple, one after another being added until all or as many as are necessary are in use. Thus the temperature of the light or the electric cautery attached to the posts H and H' can be adjusted at pleasure by merely turning the screw M.

It is evident that various modified forms of circuit-closers and of various elements of my device may be substituted without departing from my invention, also that but one pair of binding-posts can be readily used in place of two pairs of the same, as shown.

Having thus fully described my invention, what I claim, and desire to secure by Letters Patent, is—

1. In combination with a series of battery-cells, a pair of bus-bars, circuit-closers adapted to connect the respective poles of the cells in multiple to the respective bus-bars, circuit-closers to connect the cells to each other in series and means for operating all of the circuit-closers, substantially as described.

2. In combination with a series of battery-cells, a pair of bus-bars, circuit-closers to connect the respective poles of the cells in multiple with the respective bus-bars, a rotary switch connected by separate conductors to one pole of each cell, circuit-closers to connect the positive and negative poles of the cells in series, and means for operating the circuit-closers, substantially as described.

3. In combination with a series of battery-cells, a rotary switch, separate conductors connecting the rotary switch to one pole of each cell, a bus-bar, circuit-closers to connect each of said conductors to the bus-bar, a second bus-bar, circuit-closers adapted to alternately connect the other pole of each cell to the second bus-bar, and to one of the said conductors, substantially as described.

4. In combination with a series of battery-cells, a rotary switch, separate conductors connecting the rotary switch to one pole of each cell, a circuit-closer connecting the other poles of the cells in series with said conductors, means for simultaneously operating said circuit-closers, a pair of bus-bars, two series of circuit-closers arranged in pairs and connecting the respective poles of the cells with the respective bus-bars, and means for successively closing the circuits of the respective cells, substantially as described.

5. In combination with a series of battery-cells, a positive bus-bar, a negative bus-bar, circuit-closers arranged in opposing pairs and connecting the respective poles of the cells with the respective bus-bars, and a bar pivoted at one end and adjustable at the other end whereby the circuits of the cells are closed in succession, substantially as described.

6. In combination with a series of battery-cells, a series of circuit-closers adapted to connect the cells in series, a bar adapted to operate the closers successively, a series of circuit-closers adapted to connect the cells in multiple, and a bar adapted to operate the said closers successively, substantially as described.

7. In combination with a series of battery-cells, a rotary switch connected to one pole of each cell by a separate conductor, circuit-closers adapted to connect said conductors in multiple to a single conductor, circuit-closers adapted to severally connect the other poles of the cells in multiple to another single conductor, adapted to connect the cells in series, and means for operating the several series of circuit-closers, substantially as described.

8. In combination with a series of battery-cells, a rotary switch connected to one pole of each cell by a separate conductor, a bus-bar, a spring circuit-closer connected to each conductor and adapted to contact the bus-bar, a second bus-bar, a spring circuit-closer attached to the other pole of each battery and adapted to contact said second bus-bar, the respective closers of each cell being arranged in opposing pairs, an adjustable bar adapted to engage the said pair of circuit-closers and close the circuits of the cells in succession, a spring circuit-closer also connected with the last-named pole of each cell and adapted to connect the same with the conductor of the adjacent battery, and an adjustable bar to engage and operate said closers, substantially as described.

9. In combination with a series of battery-cells a series of circuit-closers adapted to connect the cells in series, a series of circuit-closers adapted to connect the cells in multiple, and two bars to alternately operate the respective series of circuit-closers; a lever pivoted intermediate its length and engaging the respective bars at its respective ends, substantially as described.

10. In combination with a series of battery-cells, a rotary switch, a binding-post connected to the center post of the rotary switch, a separate conductor from the several contacts of the rotary switch to the several positive poles of the cells, a positive bus-bar and a negative bus-bar, a spring circuit-closer to engage each of said conductors with the positive bus-bar, a contact-point in all but one of said conductors connected to the negative poles of all but one of the cells and adapted to alternately connect with the negative bus-bar, a binding-post connected to the negative pole of the first cell, binding-posts connected to the bus-bars, and means for operating the several series of circuit-closers, substantially as described.

In testimony whereof I affix my signature in presence of two witnesses.

WILLIAM W. KEIRSTEAD.

Witnesses:
LUTHER V. MOULTON,
FRANK J. HAIGHT.